(12) United States Patent
Akanksha et al.

(10) Patent No.: US 11,870,932 B2
(45) Date of Patent: Jan. 9, 2024

(54) SYSTEMS AND METHODS OF GATEWAY DETECTION IN A TELEPHONE NETWORK

(71) Applicant: Pindrop Security, Inc., Atlanta, GA (US)

(72) Inventors: Akanksha, Atlanta, GA (US); Terry Nelms, II, Atlanta, GA (US); Kailash Patil, Atlanta, GA (US); Chirag Tailor, Atlanta, GA (US); Khaled Lakhdhar, Atlanta, GA (US)

(73) Assignee: Pindrop Security, Inc., Atlanta, GA (US)

( * ) Notice: Subject to any disclaimer, the term of this patent is extended or adjusted under 35 U.S.C. 154(b) by 0 days.

(21) Appl. No.: 17/706,398

(22) Filed: Mar. 28, 2022

(65) Prior Publication Data

US 2022/0224793 A1    Jul. 14, 2022

Related U.S. Application Data

(63) Continuation of application No. 17/317,575, filed on May 11, 2021, now Pat. No. 11,290,593, which is a continuation of application No. 16/784,071, filed on Feb. 6, 2020, now Pat. No. 11,019,201.

(60) Provisional application No. 62/802,116, filed on Feb. 6, 2019.

(51) Int. Cl.
*H04M 3/42* (2006.01)
*G06N 20/00* (2019.01)

(52) U.S. Cl.
CPC ........ *H04M 3/42102* (2013.01); *G06N 20/00* (2019.01); *H04M 2203/556* (2013.01); *H04M 2203/558* (2013.01)

(58) Field of Classification Search
CPC ....... H04M 3/42102; H04M 2203/556; H04M 2203/558; G06N 20/00
USPC .......... 379/142.01, 142.05, 142.06, 133, 134
See application file for complete search history.

(56) References Cited

U.S. PATENT DOCUMENTS

| | | |
|---|---|---|
| 4,817,156 A | 3/1989 | Bahl et al. |
| 4,829,577 A | 5/1989 | Kuroda et al. |
| 4,972,485 A | 11/1990 | Dautrich et al. |
| 5,072,452 A | 12/1991 | Brown et al. |
| 5,461,697 A | 10/1995 | Nishimura et al. |
| 5,475,792 A | 12/1995 | Stanford et al. |
| 5,598,507 A | 1/1997 | Kimber et al. |
| 5,659,662 A | 8/1997 | Wilcox et al. |

(Continued)

FOREIGN PATENT DOCUMENTS

| | | |
|---|---|---|
| WO | WO-2015/079885 | 6/2015 |
| WO | WO-2016/195261 A1 | 12/2016 |
| WO | WO-2017/167900 A1 | 10/2017 |

OTHER PUBLICATIONS

Ahmad et al., "A Unique Approach in Text Independent Speaker Recognition using MFCC Feature Sets and Probabilistic Neural Network", Eighth International Conference on Advances in Pattern Recognition (ICAPR}, IEEE, 2015 (6 pages).

(Continued)

*Primary Examiner* — Binh Kien Tieu
(74) *Attorney, Agent, or Firm* — Foley & Lardner LLP

(57) ABSTRACT

Embodiments described herein provide for detecting whether an Automatic Number Identification (ANI) associated with an incoming call is a gateway, according to rules-based models and machine learning models generated by the computer using call data stored in one or more databases.

20 Claims, 4 Drawing Sheets

(56) References Cited

U.S. PATENT DOCUMENTS

| | | | |
|---|---|---|---|
| 5,835,890 A | 11/1998 | Matsui et al. | |
| 5,867,562 A * | 2/1999 | Scherer | H04M 3/436 379/114.15 |
| 5,949,874 A | 9/1999 | Mark | |
| 5,995,927 A | 11/1999 | Li | |
| 6,009,392 A | 12/1999 | Kanevsky et al. | |
| 6,021,119 A | 2/2000 | Derks et al. | |
| 6,055,498 A | 4/2000 | Neumeyer et al. | |
| 6,094,632 A | 7/2000 | Hattori | |
| 6,141,644 A | 10/2000 | Kuhn et al. | |
| 6,411,930 B1 | 6/2002 | Burges | |
| 6,463,413 B1 | 10/2002 | Applebaum et al. | |
| 6,519,561 B1 | 2/2003 | Farrell et al. | |
| 6,760,701 B2 | 7/2004 | Sharma et al. | |
| 6,882,972 B2 | 4/2005 | Kompe et al. | |
| 6,922,668 B1 | 7/2005 | Downey | |
| 6,975,708 B1 * | 12/2005 | Scherer | H04M 3/436 379/127.01 |
| 7,003,460 B1 | 2/2006 | Bub et al. | |
| 7,209,881 B2 | 4/2007 | Yoshizawa et al. | |
| 7,295,970 B1 | 11/2007 | Gorin et al. | |
| 7,318,032 B1 | 1/2008 | Chaudhari et al. | |
| 7,324,941 B2 | 1/2008 | Choi et al. | |
| 7,739,114 B1 | 6/2010 | Chen et al. | |
| 7,813,927 B2 | 10/2010 | Navratil et al. | |
| 8,046,230 B1 | 10/2011 | Mcintosh | |
| 8,112,160 B2 | 2/2012 | Foster | |
| 8,160,811 B2 | 4/2012 | Prokhorov | |
| 8,160,877 B1 | 4/2012 | Nucci et al. | |
| 8,385,536 B2 * | 2/2013 | Whitehead | H04M 1/2746 379/355.02 |
| 8,484,023 B2 | 7/2013 | Kanevsky et al. | |
| 8,484,024 B2 | 7/2013 | Kanevsky et al. | |
| 8,554,563 B2 | 10/2013 | Aronowitz | |
| 8,712,760 B2 | 4/2014 | Hsia et al. | |
| 8,738,442 B1 | 5/2014 | Liu et al. | |
| 8,856,895 B2 | 10/2014 | Perrot | |
| 8,886,663 B2 | 11/2014 | Gainsboro et al. | |
| 8,903,859 B2 | 12/2014 | Zeppenfeld et al. | |
| 9,042,867 B2 | 5/2015 | Gomar | |
| 9,064,491 B2 | 6/2015 | Rachevsky et al. | |
| 9,277,049 B1 | 3/2016 | Danis | |
| 9,336,781 B2 | 5/2016 | Scheffer et al. | |
| 9,338,619 B2 | 5/2016 | Kang | |
| 9,343,067 B2 | 5/2016 | Ariyaeeinia et al. | |
| 9,344,892 B1 | 5/2016 | Rodrigues et al. | |
| 9,355,646 B2 | 5/2016 | Oh et al. | |
| 9,373,330 B2 | 6/2016 | Cumani et al. | |
| 9,401,143 B2 | 7/2016 | Senior et al. | |
| 9,401,148 B2 | 7/2016 | Lei et al. | |
| 9,406,298 B2 | 8/2016 | Cumani et al. | |
| 9,431,016 B2 | 8/2016 | Aviles-Casco et al. | |
| 9,444,839 B1 * | 9/2016 | Faulkner | H04L 63/0876 |
| 9,454,958 B2 | 9/2016 | Li et al. | |
| 9,460,722 B2 | 10/2016 | Sidi et al. | |
| 9,466,292 B1 | 10/2016 | Lei et al. | |
| 9,502,038 B2 | 11/2016 | Wang et al. | |
| 9,514,753 B2 | 12/2016 | Sharifi et al. | |
| 9,558,755 B1 | 1/2017 | Laroche et al. | |
| 9,584,946 B1 | 2/2017 | Lyren et al. | |
| 9,620,145 B2 | 4/2017 | Bacchiani et al. | |
| 9,626,971 B2 | 4/2017 | Rodriguez et al. | |
| 9,633,652 B2 | 4/2017 | Kurniawati et al. | |
| 9,641,954 B1 | 5/2017 | Typrin et al. | |
| 9,665,823 B2 | 5/2017 | Saon et al. | |
| 9,685,174 B2 | 6/2017 | Karam et al. | |
| 9,729,727 B1 * | 8/2017 | Zhang | H04M 15/56 |
| 9,818,431 B2 | 11/2017 | Yu | |
| 9,824,692 B1 | 11/2017 | Khoury et al. | |
| 9,860,367 B1 | 1/2018 | Jiang et al. | |
| 9,875,739 B2 | 1/2018 | Ziv et al. | |
| 9,875,742 B2 | 1/2018 | Gorodetski et al. | |
| 9,875,743 B2 | 1/2018 | Gorodetski et al. | |
| 9,881,617 B2 | 1/2018 | Sidi et al. | |
| 9,930,088 B1 | 3/2018 | Hodge | |
| 9,984,706 B2 | 5/2018 | Wein | |
| 10,277,628 B1 | 4/2019 | Jakobsson | |
| 10,325,601 B2 | 6/2019 | Khoury et al. | |
| 10,347,256 B2 | 7/2019 | Khoury et al. | |
| 10,397,398 B2 | 8/2019 | Gupta | |
| 10,404,847 B1 | 9/2019 | Unger | |
| 10,462,292 B1 | 10/2019 | Stephens | |
| 10,506,088 B1 | 12/2019 | Singh | |
| 10,554,821 B1 | 2/2020 | Koster | |
| 10,638,214 B1 | 4/2020 | Delhoume et al. | |
| 10,659,605 B1 | 5/2020 | Braundmeier et al. | |
| 10,679,630 B2 | 6/2020 | Khoury et al. | |
| 10,854,205 B2 | 12/2020 | Khoury et al. | |
| 11,069,352 B1 | 7/2021 | Tang et al. | |
| 2002/0095287 A1 | 7/2002 | Botterweck | |
| 2002/0143539 A1 | 10/2002 | Botterweck | |
| 2003/0231775 A1 | 12/2003 | Wark | |
| 2003/0236663 A1 | 12/2003 | Dimitrova et al. | |
| 2004/0218751 A1 | 11/2004 | Colson et al. | |
| 2004/0230420 A1 | 11/2004 | Kadambe et al. | |
| 2005/0038655 A1 | 2/2005 | Mutel et al. | |
| 2005/0039056 A1 | 2/2005 | Bagga et al. | |
| 2005/0286688 A1 | 12/2005 | Scherer | |
| 2006/0058998 A1 | 3/2006 | Yamamoto et al. | |
| 2006/0111905 A1 | 5/2006 | Navratil et al. | |
| 2006/0293771 A1 | 12/2006 | Tazine et al. | |
| 2007/0189479 A1 | 8/2007 | Scherer | |
| 2007/0198257 A1 | 8/2007 | Zhang et al. | |
| 2007/0294083 A1 | 12/2007 | Bellegarda et al. | |
| 2008/0195389 A1 | 8/2008 | Zhang et al. | |
| 2008/0312926 A1 | 12/2008 | Vair et al. | |
| 2009/0138712 A1 | 5/2009 | Driscoll | |
| 2009/0265328 A1 * | 10/2009 | Parekh | G06F 16/334 707/999.005 |
| 2010/0131273 A1 | 5/2010 | Aley-Raz et al. | |
| 2010/0217589 A1 | 8/2010 | Gruhn et al. | |
| 2010/0232619 A1 | 9/2010 | Uhle et al. | |
| 2010/0262423 A1 | 10/2010 | Huo et al. | |
| 2011/0010173 A1 | 1/2011 | Scott et al. | |
| 2012/0173239 A1 | 7/2012 | Asenjo et al. | |
| 2012/0185418 A1 | 7/2012 | Capman et al. | |
| 2013/0041660 A1 | 2/2013 | Waite | |
| 2013/0080165 A1 | 3/2013 | Wang et al. | |
| 2013/0109358 A1 * | 5/2013 | Balasubramaniyan | H04L 43/0829 455/411 |
| 2013/0300939 A1 | 11/2013 | Chou et al. | |
| 2014/0046878 A1 | 2/2014 | Lecomte et al. | |
| 2014/0053247 A1 | 2/2014 | Fadel | |
| 2014/0081640 A1 | 3/2014 | Farrell et al. | |
| 2014/0195236 A1 | 7/2014 | Hosom et al. | |
| 2014/0214417 A1 | 7/2014 | Wang et al. | |
| 2014/0214676 A1 | 7/2014 | Bukai | |
| 2014/0241513 A1 | 8/2014 | Springer | |
| 2014/0250512 A1 | 9/2014 | Goldstone et al. | |
| 2014/0278412 A1 | 9/2014 | Scheffer et al. | |
| 2014/0288928 A1 | 9/2014 | Penn et al. | |
| 2014/0337017 A1 | 11/2014 | Watanabe et al. | |
| 2015/0036813 A1 | 2/2015 | Ananthakrishnan et al. | |
| 2015/0127336 A1 | 5/2015 | Lei et al. | |
| 2015/0149165 A1 | 5/2015 | Saon | |
| 2015/0161522 A1 | 6/2015 | Saon et al. | |
| 2015/0189086 A1 | 7/2015 | Romano et al. | |
| 2015/0199960 A1 | 7/2015 | Huo et al. | |
| 2015/0269931 A1 | 9/2015 | Senior et al. | |
| 2015/0269941 A1 | 9/2015 | Jones | |
| 2015/0310008 A1 | 10/2015 | Thudor et al. | |
| 2015/0334231 A1 | 11/2015 | Rybak et al. | |
| 2015/0348571 A1 | 12/2015 | Koshinaka et al. | |
| 2015/0356630 A1 | 12/2015 | Hussain | |
| 2015/0365530 A1 | 12/2015 | Kolbegger et al. | |
| 2016/0019458 A1 | 1/2016 | Kaufhold | |
| 2016/0019883 A1 | 1/2016 | Aronowitz | |
| 2016/0028434 A1 | 1/2016 | Kerpez et al. | |
| 2016/0078863 A1 | 3/2016 | Chung et al. | |
| 2016/0104480 A1 | 4/2016 | Sharifi | |
| 2016/0125877 A1 | 5/2016 | Foerster et al. | |
| 2016/0180214 A1 | 6/2016 | Kanevsky et al. | |
| 2016/0189707 A1 | 6/2016 | Donjon et al. | |

(56) References Cited

U.S. PATENT DOCUMENTS

| | | | |
|---|---|---|---|
| 2016/0240190 | A1 | 8/2016 | Lee et al. |
| 2016/0275953 | A1 | 9/2016 | Sharifi et al. |
| 2016/0284346 | A1 | 9/2016 | Visser et al. |
| 2016/0293167 | A1 | 10/2016 | Chen et al. |
| 2016/0314790 | A1 | 10/2016 | Tsujikawa et al. |
| 2016/0343373 | A1 | 11/2016 | Ziv et al. |
| 2017/0060779 | A1 | 3/2017 | Falk |
| 2017/0069313 | A1 | 3/2017 | Aronowitz |
| 2017/0069327 | A1 | 3/2017 | Heigold et al. |
| 2017/0098444 | A1 | 4/2017 | Song |
| 2017/0111515 | A1* | 4/2017 | Bandyopadhyay ... H04M 15/41 |
| 2017/0126884 | A1 | 5/2017 | Balasubramaniyan et al. |
| 2017/0142150 | A1* | 5/2017 | Sandke ............... H04L 63/1466 |
| 2017/0169816 | A1 | 6/2017 | Blandin et al. |
| 2017/0230390 | A1* | 8/2017 | Faulkner ................. H04L 67/02 |
| 2017/0262837 | A1 | 9/2017 | Gosalia |
| 2018/0082691 | A1 | 3/2018 | Khoury et al. |
| 2018/0152558 | A1 | 5/2018 | Chan et al. |
| 2018/0249006 | A1 | 8/2018 | Dowlatkhah et al. |
| 2018/0295235 | A1 | 10/2018 | Tatourian et al. |
| 2018/0337962 | A1 | 11/2018 | Ly et al. |
| 2019/0037081 | A1 | 1/2019 | Rao et al. |
| 2019/0172476 | A1 | 6/2019 | Wung et al. |
| 2019/0174000 | A1* | 6/2019 | Bharrat ............. H04M 3/42059 |
| 2019/0180758 | A1 | 6/2019 | Washio |
| 2019/0238956 | A1 | 8/2019 | Gaubitch et al. |
| 2019/0297503 | A1 | 9/2019 | Traynor et al. |
| 2020/0137221 | A1 | 4/2020 | Dellostritto et al. |
| 2020/0195779 | A1 | 6/2020 | Weisman et al. |
| 2020/0252510 | A1 | 8/2020 | Ghuge et al. |
| 2020/0312313 | A1 | 10/2020 | Maddali et al. |
| 2020/0396332 | A1 | 12/2020 | Gayaldo |
| 2021/0084147 | A1 | 3/2021 | Kent et al. |
| 2021/0150010 | A1* | 5/2021 | Strong .................. H04M 3/527 |

OTHER PUBLICATIONS

Almaadeed, et al., "Speaker identification using multimodal neural networks and wavelet analysis," IET Biometrics 4.1 (2015), 18-28.
Atrey, et al., "Audio based event detection for multimedia surveillance", Acoustics, Speech and Signal Processing, 2006, ICASSP 2006 Proceedings, 2006 IEEE International Conference on vol. 5, IEEE, 2006. pp. 813-816.
Baraniuk, "Compressive Sensing [Lecture Notes]", IEEE Signal Processing Magazine, vol. 24, Jul. 2007, 4 pages.
Bredin, "TristouNet: Triplet Loss for Speaker Turn Embedding", Arxiv.org, Cornell University Library, 201 Olin Library Cornell University Ithaca, NY 14853, Sep. 14, 2016, XP080726602.
Castaldo et al., "Compensation of Nuisance Factors for Speaker and Language Recognition," IEEE Transactions on Audio, Speech and Language Processing, ieeexplore.ieee.org, vol. 15, No. 7, Sep. 2007. pp. 1969-1978.
Communication pursuant to Article 94(3) EPC issued in EP Application No. 17 772 184.2-1207 dated Jul. 19, 2019.
Communication pursuant to Article 94(3) EPC on EP 17772184.2 dated Jun. 18, 2020.
Cumani, et al., "Factorized Sub-space Estimation for Fast and Memory Effective I-Vector Extraction", IEEE/ACM TASLP, vol. 22, Issue 1, Jan. 2014, 28 pages.
Dehak, et al., "Front-End Factor Analysis for Speaker Verification", IEEE Transactions on Audio, Speech, and Language Processing, vol. 19, No. 4, May 2011, pp. 788-798.
Douglas A. Reynolds et al., "Speaker Verification Using Adapted Gaussian Mixture Models," Digital Signal Processing 10, 2000, pp. 19-41.
Examination Report for IN 201947014575 dated Nov. 16, 2021 (6 pages).
Examination Report No. 1 for AU 2017322591 dated Jul. 16, 2021 (2 pages).
Final Office Action for U.S. Appl. No. 16/200,283 dated Jun. 11, 2020 (15 pages).
Final Office Action for U.S. Appl. No. 16/784,071 dated Oct. 27, 2020 (12 pages).
Final Office Action on U.S. Appl. No. 15/872,639 dated Jan. 29, 2019.
Final Office Action on U.S. Appl. No. 16/829,705 dated Mar. 24, 2022.
First Office Action issued in KR 10-2019-7010-7010208 dated Jun. 29, 2019.
First Office Action issued on CA Application No. 3,036,533 dated Apr. 12, 2019.
First Office Action on CA Application No. 3,075,049 dated May 7, 2020.
Florian et al., "FaceNet: a unified embedding for face recognition and clustering", 2015 IEEE Conference on Computer Vision and Pattern Recognition (CVPR), IEEE, Jun. 7, 2015, pp. 815-823, XP032793492, DOI: 10.1109/CVPR.2015.7298682.
Foreign Search Report on PCT PCT/US2020/026992 dated Jun. 26, 2020.
Fu et al., "SNR-Aware Convolutional Neural Network Modeling for Speech Enhancement", INTERSPEECH 2016, Sep. 8-12, 2016, pp. 3768-3772, XP055427533, ISSN: 1990-9772, DOI: 10.21437/Interspeech.2016-211 (5 pages).
Gao, et al., "Dimensionality reduction via compressive sensing", Pattern Recognition Letters 33, Elsevier Science BV 0167-8655, 2012. 8 pages.
Garcia-Romero et al., "Unsupervised Domain Adaptation for I-Vector Speaker Recgonition" Odyssey 2014, pp. 260-264.
Ghahabi Omid et al., "Restricted Boltzmann Machine Supervectors for Speaker Recognition", 2015 IEEE International Conference on acoustics, Speech and Signal Processing (ICASSP), IEEE, Apr. 19, 2015, XP033187673, pp. 4804-4808 (5 pages).
Gish, et al., "Segregation of Speakers for Speech Recognition and Speaker Identification", Acoustics, Speech, and Signal Processing, 1991, ICASSP-91, 1991 International Conference on IEEE, 1991. pp. 873-876.
Hoffer et al., "Deep Metric Learning Using Triplet Network", 2015, arXiv: 1412.6622v3, retrieved Oct. 4, 2021 from URL: https://deepsense.ai/wp-content/uploads/2017/08/1412.6622-3.pdf (8 pages).
Hoffer et al., "Deep Metric Learning Using Triplet Network," ICLR 2015 (workshop contribution), Mar. 23, 2015, retrieved from <https://arxiv.org/pdf/1412.6622v3.pdf> on Dec. 8, 2016.
Huang, et al., "A Blind Segmentation Approach to Acoustic Event Detection Based on I-Vector", INTERSPEECH, 2013. pp. 2282-2286.
Information Disclosure Statement filed Aug. 8, 2019.
International Preliminary Report on Patentability for PCT/US2020/017051 dated Aug. 19, 2021 (11 pages).
International Preliminary Report on Patentability, Ch. I, for PCT/US2017/039697 dated Jan. 1, 2019 (10 pages).
International Preliminary Report on Patentability, Ch. I, for PCT/US2017/052293 dated Mar. 19, 2019 (8 pages).
International Preliminary Report on Patentability, Ch. I, for PCT/US2017/052335 dated Mar. 19, 2019 (8 pages).
International Preliminary Report on Patentability, Ch. I, for PCT/US2020/026992 dated Oct. 21, 2021 (10 pages).
International Search Report and Written Opinion for PCT/US20/17051 dated Apr. 23, 2020 (12 pages).
International Search Report and Written Opinion for PCT/US2017/052335 dated Dec. 8, 2017 (10 pages).
International Search Report and Written Opinion for PCT/US2020/24709 dated Jun. 19, 2020 (10 pages).
International Search Report and Written Opinion issued in corresponding International Application No. PCT/US2018/013965 dated May 14, 2018.
International Search Report and written Opinion issued in International Application No. PCT/US20/26992 dated Jun. 26, 2020.
International Search Report and Written Opinion issued in the corresponding International Application No. PCT/US2017/039697, dated Sep. 20, 2017. 17 pages.
International Search Report and Written Opinion of the International Searching Authority issued in corresponding International Application No. PCT/US2017/050927 dated Dec. 11, 2017.

(56) References Cited

OTHER PUBLICATIONS

International Search Report issued in corresponding International Application No. PCT/US2017/052293 dated Dec. 21, 2017.
International Search Report issued in corresponding International Application No. PCT/US2017/052316 dated Dec. 21, 2017. 3 pages.
Kenny et al., "Deep Neural Networks for extracting Baum-Welch statistics for Speaker Recognition", Jun. 29, 2014, XP055361192, Retrieved from the Internet: URL:http://www.crim.ca/perso/patrick.kenny/stafylakis_odyssey2014_v2.pdf, [retrieved on Apr. 3, 2017].
Kenny, "A Small Footprint i-Vector Extractor" Proc. Odyssey Speaker and Language Recognition Workshop, Singapore, Jun. 25, 2012. 6 pages.
Khoury et al., "Combining Transcription-Based and Acoustic-Basedd Speaker Identifications for Broadcast News", ICASSP, Kyoto, Japan, 2012, pp. 4377-4380.
Khoury, et al., "Improvised Speaker Diariztion System for Meetings", Acoustics, Speech and Signal Processing, 2009, ICASSP 2009, IEEE International Conference on IEEE, 2009. pp. 4097-4100.
Kockmann et al., "Syllable based Feature-Contours for Speaker Recognition," Proc. 14th International Workshop on Advances, 2008. 4 pages.
Korean Office Action (with English summary), dated Jun. 29, 2019, issued in Korean application No. 10-2019-7010208, 6 pages.
Lei et al., "A Novel Scheme for Speaker Recognition Using a Phonetically-aware Deep Neural Network", Proceedings on ICASSP, Florence, Italy, IEEE Press, 2014, pp. 1695-1699.
Luque, et al., "Clustering Initialization Based on Spatial Information for Speaker Diarization of Meetings", Ninth Annual Conference of the International Speech Communication Association, 2008. pp. 383-386.
McLaren, et al., "Advances in deep neural network approaches to speaker recognition," In Proc. 40th IEEE International Conference on Acoustics, Speech and Signal Processing (ICASSP), 2015.
McLaren, et al., "Exploring the Role of Phonetic Bottleneck Features for Speaker and Language Recognition", 2016 IEEE International Conference on Acoustics, Speech and Signal Processing (ICASSP), Mar. 2016, pp. 5575-5579.
Meignier, et al., "Lium Spkdiarization: an Open Source Toolkit for Diarization" CMU SPUD Workshop, 2010. 7 pages.
Non-Final Office Action for U.S. Appl. No. 15/709,290 dated Oct. 5, 2018 (12 pages).
Non-Final Office Action for U.S. Appl. No. 16/200,283 dated Jan. 7, 2020 (10 pages).
Non-Final Office Action for U.S. Appl. No. 16/442,368 dated Oct. 4, 2019 (10 pages).
Non-Final Office Action for U.S. Appl. No. 16/784,071 dated May 12, 2020 (10 pages).
Non-Final Office Action for U.S. Appl. No. 16/829,705 dated Nov. 10, 2021 (20 pages).
Non-Final Office Action on U.S. Appl. No. 15/610,378 dated Mar. 1, 2018.
Non-Final Office Action on U.S. Appl. No. 15/872,639 dated Aug. 23, 2018.
Non-Final Office Action on U.S. Appl. No. 16/551,327 dated Dec. 9, 2019.
Notice of Allowance for U.S. Appl. No. 15/610,378 dated Aug. 7, 2018 (5 pages).
Notice of Allowance for U.S. Appl. No. 15/709,290 dated Feb. 6, 2019 (6 pages).
Notice of Allowance for U.S. Appl. No. 16/200,283 dated Aug. 24, 2020 (7 pages).
Notice of Allowance for U.S. Appl. No. 16/442,368 dated Feb. 5, 2020 (7 pages).
Notice of Allowance for U.S. Appl. No. 16/784,071 dated Jan. 27, 2021 (14 pages).
Notice of Allowance for U.S. Appl. No. 17/317,575 dated Jan. 28, 2022 (11 pages).
Notice of Allowance on U.S. Appl. No. 15/262,748 dated Sep. 13, 2017.
Notice of Allowance on U.S. Appl. No. 15/818,231 dated Mar. 27, 2019.
Notice of Allowance on U.S. Appl. No. 15/872,639 dated Apr. 25, 2019.
Notice of Allowance on U.S. Appl. No. 16/551,327 dated Mar. 26, 2020.
Notification of Transmittal of the International Search Report and the Written Opinion of the International Searching Authority, dated May 14, 2018, in corresponding International Application No. PCT/US2018/013965, 13 pages.
Novoselov, et al., "SIC Speaker Recognition System for the NIST i-Vector Challenge." Odyssey: The Speaker and Language Recognition Workshop. Jun. 16-19, 2014. pp. 231-240.
Oguzhan et al., "Recognition of Acoustic Events Using Deep Neural Networks", 2014 22nd European Signal Processing Conference (EUSiPCO), Sep. 1, 2014, pp. 506-510 (5 pages).
Piegeon, et al., "Applying Logistic Regression to the Fusion of the NIST'99 1-Speaker Submissions", Digital Signal Processing Oct. 1-3, 2000. pp. 237-248.
Prazak et al., "Speaker Diarization Using PLDA-based Speaker Clustering", The 6th IEEE International Conference on Intelligent Data Acquisition and Advanced Computing Systems: Technology and Applications, Sep. 2011, pp. 347-350 (4 pages).
Prince, et al., "Probabilistic Linear Discriminant Analysis for Inferences About Identity," Proceedings of the International Conference on Computer Vision, Oct. 14-21, 2007. 8 pages.
Reasons for Refusal for JP 2019-535198 dated Sep. 10, 2021 (7 pages).
Reynolds et al., "Speaker Verification Using Adapted Gaussian Mixture Models," Digital Signal Processing 10, 2000, pp. 19-41.
Richardson, et al., "Channel Compensation for Speaker Recognition using MAP Adapted PLDA and Denoising DNNs", Proc. Speaker Lang. Recognit. Workshop, Jun. 22, 2016, pp. 225-230.
Richardson, et al., "Deep Neural Network Approaches to Speaker and Language Recognition", IEEE Signal Processing Letters, vol. 22, No. 10, Oct. 2015, pp. 1671-1675.
Richardson, et al., "Speaker Recognition Using Real vs Synthetic Parallel Data for DNN Channel Compensation", INTERSPEECH, 2016. 6 pages.
Richardson, et al., Speaker Recognition Using Real vs Synthetic Parallel Data for DNN Channel Compensation, INTERSPEECH, 2016, retrieved Sep. 14, 2021 from URL: https://www.ll.mit.edu/sites/default/files/publication/doc/2018-05/2016-Richardson-Interspeech.pdf (6 pages).
Rouvier et al., "An Open-source State-of-the-art Toolbox for Broadcast News Diarization", INTERSPEECH, Aug. 2013, pp. 1477-1481 (5 pages).
Scheffer et al., "Content matching for short duration speaker recognition", INTERSPEECH, Sep. 14-18, 2014, pp. 1317-1321.
Schmidt et al., "Large-Scale Speaker Identification" ICASSP, 2014, pp. 1650-1654.
Seddik, et al., "Text independent speaker recognition using the Mel frequency cepstral coefficients and a neural network classifier." First International Symposium on Control, Communications and Signal Processing, 2004. IEEE, 2004.
Shajeesh, et al., "Speech Enhancement based on Savitzky-Golay Smoothing Filter", International Journal of Computer Applications, vol. 57, No. 21, Nov. 2012, pp. 39-44 (6 pages).
Shum et al., "Exploiting Intra-Conversation Variability for Speaker Diarization", INTERSPEECH, Aug. 2011, pp. 945-948 (4 pages).
Snyder et al., "Time Delay Deep Nueral Network-Based Universal Background Models for Speaker Recognition", IEEE Workshop on Automatic Speech Recognition and Understanding (ASRU), 2015, pp. 92-97 (6 pages).
Solomonoff, et al., "Nuisance Attribute Projection", Speech Communication, Elsevier Science BV, Amsterdam, The Netherlands, May 1, 2007. 74 pages.
Sturim et al., "Speaker Linking and Applications Using Non-parametric Hashing Methods," Interspeech, Sep. 2016, 5 pages.

(56) References Cited

OTHER PUBLICATIONS

Summons to attend oral proceedings pursuant to Rule 115(1) EPC issued in EP Application No. 17 772 184.2-1207 dated Dec. 16, 2019.
Temko, et al., "Acoustic event detection in meeting-room environments", Pattern Recognition Letters, vol. 30, No. 14, 2009, pp. 1281-1288.
Temko, et al., "Classification of acoustic events using SVM-based clustering schemes", Pattern Recognition, vol. 39, No. 4, 2006, pp. 682-694.
Uzan et al., "I Know That Voice: Identifying the Voice Actor Behind the Voice", 2015 International Conference on Biometrics (ICB), 2015, retrieved Oct. 4, 2021 from URL: https://citeseerx.ist.psu.edu/viewdoc/download?doi=10.1.1.715.8031&rep=rep1&type=pdf (6 pages).
Vella et al., "Artificial neural network features for speaker diarization", 2014 IEEE Spoken Language Technology Workshop (SLT), IEEE Dec. 7, 2014, pp. 402-406, XP032756972, DOI: 10.1109/SLT.2014.7078608.
Wang et al., "Learning Fine-Grained Image Similarity with Deep Ranking", Computer Vision and Pattern Recognition, Jan. 17, 2014, arXiv: 1404.4661v1, retrieved Oct. 4, 2021 from URL: https://arxiv.org/pdf/1404.4661.pdf (8 pages).
Xiang, et al., "Efficient text-independent speaker verification with structural Gaussian mixture models and neural network." IEEE Transactions on Speech and Audio Processing 11.5 (2003): 447-456.
Xu et al., "Rapid Computation of I-Vector" Odyssey, Bilbao, Spain, Jun. 21-24, 2016. 6 pages.
Xue et al., "Fast Query by Example of Enviornmental Sounds via Robust and Efficient Cluster-Based Indexing", Acoustics, Speech and Signal Processing (ICASSP), IEEE, 2008, pp. 5-8 (4 pages).
Yella Sree Harsha et al., "Artificial neural network features for speaker diarization", 2014 IEEE Spoken Language technology Workshop (SLT), IEEE, Dec. 7, 2014, pp. 402-406, XP032756972, DOI: 10.1109/SLT.2014.7078608.
Zhang et al., "Extracting Deep Neural Network Bottleneck Features Using Low-Rank Matrix Factorization", IEEE, ICASSP, 2014. 5 pages.
Zheng, et al., "An Experimental Study of Speech Emotion Recognition Based on Deep Convolutional Neural Networks", 2015 International Conference on Affective Computing and Intelligent Interaction (ACII), 2015, pp. 827-831 (5 pages).
Notice of Allowance on US Appl. U.S. Appl. No. 16/536,293 dated Jun. 3, 2022 (9 pages).
D.Etter and C.Domniconi, "Multi2Rank: Multimedia Multiview Ranking," 2015 IEEE International Conference on Multimedia Big Data, 2015, pp. 80-87. (Year 2015).
T.C.Nagavi, S.B. Anusha, P.Monisha and S.P.Poomima, "Content based audio retrieval with MFCC feature extraction, clustering and sort-merge techniquest," 2013 Fourth International Conference on Computing, Communications and Networking Technologies (ICCCNT), 2013, pp. 1-6. (Year 2013).
Australian Examination Report on AU Appl. Ser. No. 2021286422 dated Oct. 21, 2022 (2 pages).
Buera et al., "Unsupervised Data-Driven Feature Vector Normalization With Acoustic Model Adaptation for Robust Speech Recognition", IEEE Transactions on Audio, Speech, and Language Processing, vol. 18, No. 2, Feb. 2010, pp. 296-309 (14 pages).
Campbell, "Using Deep Belief Networks for Vector-Based Speaker Recognition", Proceedings of Interspeech 2014, Sep. 14, 2014, pp. 676-680, XP055433784.
Examination Report for EP 17778046.7 dated Jun. 16, 2020 (4 pages).
First Examiners Requisition on CA Appl. 3,096,378 dated Jun. 12, 2023 (3 pages).
Information Disclosure Statement filed Feb. 12, 2020 (4 pages).
International Preliminary Report on Patentability, Ch. I, for PCT/US2017/052316 dated Mar. 19, 2019 (7 pages).
Non-Final Office Action for U.S. Appl. No. 15/709,232 dated Jun. 27, 2019 (11 pages).
Non-Final Office Action for U.S. Appl. No. 15/709,232 dated Oct. 5, 2018 (21 pages).
Notice of Allowance for U.S. Appl. No. 15/709,024 dated Mar. 18, 2019 (11 pages).
Notice of Allowance for U.S. Appl. No. 15/709,232 dated Feb. 6, 2019 (11 pages).
Notice of Allowance for U.S. Appl. No. 15/709,232 dated Oct. 8, 2019 (11 pages).
Notice of Allowance for U.S. Appl. No. 16/505,452 dated Jul. 23, 2020 (8 pages).
Notice of Allowance for U.S. Appl. No. 16/505,452 dated May 13, 2020 (9 pages).
Notice of Allowance on U.S. Appl. No. 17/107,496 dated Jan. 26, 2023 (8 pages).
Office Action for CA 3036561 dated Jan. 23, 2020 (5 pages).
U.S. Non Final Office Action on US Appl. U.S. Appl. No. 17/107,496 dated Jul. 21, 2022 (7 pages).
U.S. Notice of Allowance on US Appl. U.S. Appl. No. 17/107,496 dated Sep. 28, 2022 (8 pages).
Variani et al., "Deep neural networks for small footprint text-dependent speaker verification", 2014 IEEE International Conference on Acoustics, Speech and Signal Processing (ICASSP), IEEE, May 4, 2014, pp. 4052-4056, XP032617560, DOI: 10.1109/ICASSP.2014.6854363 [retrieved on Jul. 11, 2014].
Yaman et al., "Bottleneck Features for Speaker Recognition", Proceedings of the Speaker and Language Recognition Workshop 2012, Jun. 28, 2012, pp. 105-108, XP055409424, Retrieved from the Internet: URL:https://pdfs.semanticscholar.org/3469/fe6e53e65bced5736480afe34b6c16728408.pdf [retrieved on Sep. 25, 2017].
Office Action on Japanese Application 2022-104204 dated Jul. 26, 2023 (4 pages).
First Examiner's Requisition for CA App. 3,135,210 dated Oct. 5, 2023 (5 pages).

* cited by examiner

US 11,870,932 B2

SYSTEMS AND METHODS OF GATEWAY DETECTION IN A TELEPHONE NETWORK

CROSS-REFERENCE TO RELATED APPLICATIONS

This application is a continuation of U.S. application Ser. No. 17/317,575, filed May 11, 2021, now issued as U.S. Pat. No. 11,290,593, which is a continuation of U.S. application Ser. No. 16/784,071, filed Feb. 6, 2020, now issued as U.S. Pat. No. 11,019,201, which claims priority to U.S. Provisional Application No. 62/802,116, filed Feb. 6, 2019, which above-mentioned applications are hereby incorporated by reference in their entirety.

This application is related to U.S. Pat. No. 10,325,601, entitled "Speaker Recognition In The Call Center," filed Sep. 19, 2017, which is hereby incorporated herein in its entirety.

TECHNICAL FIELD

This application generally relates to systems and methods of intelligently detecting the gateway status of phone calls for call-handling processes, and automated means for generating models used for such detection processes.

BACKGROUND

In telecommunications and related technologies (VoIP), an Automatic Number Identification (ANI), or phone number, is used to identify and target particular calls. Callees can ordinarily identify a caller based on the ANI. In many instances, an ANI may be used for authentication purposes, for example. This may suffice when an ANI is associated with one person or a household, but that is not always the case. Some ANIs are gateway ANIs. A gateway is defined as an ANI that is allocated for use by more than one person and more than one device (spoofing a number is stealing not allocation). An example gateway ANI is 1-559-515-8002, which is a Skype® gateway, commonly used as the caller's phone number when a call is made to a phone using Skype®. However, a landline telephone that is used by multiple people to make calls would not be considered a gateway, since it is a single device. It is often desirable to identify gateway ANIs to screen calls or conduct reliable authentication by adjusting an authentication test for different information.

Keeping track of ANIs is a resource intensive and somewhat manual process. Human administrators ordinarily have to update a databank of ANIs, or subscribe to some external database that publishes updated listings of ANIs. Similarly, it is often labor intensive to screen calls based on ANIs, where a person must check or confirm whether an ANI is a gateway ANI against the database listing. Because ANIs may be reassigned, the listing of gateway ANIs must be regularly updated. Therefore, what is needed is a means for automatically and dynamically classifying whether known ANIs are gateway ANIs. Likewise, what is needed is a means for automatically detecting new ANIs.

SUMMARY

Disclosed herein are systems and methods capable of addressing the above-described shortcomings and may also provide any number of additional or alternative benefits and advantages. Embodiments described herein provide for a method of automatically trains or otherwise generates computer models for determining whether a telephone call is associated with a gateway using a rule-based algorithm and a machine learning algorithm, and implementing such models and algorithms to detect if a phone number is a gateway.

In an embodiment, a computer-implemented method for detecting gateways comprises generating, by a computer, a plurality of features for a plurality of caller Automatic Number Identifications (ANIs) based upon call data associated with a plurality of phone calls involving the plurality of caller ANIs; calculating, by the computer, a gateway score for each respective caller ANI based upon a set of one or more features associated with the respective caller ANI in the plurality of features; and detecting, by the computer, that at least one caller ANI of the plurality of caller ANIs is a gateway ANI, in response to determining that the gateway score for a gateway ANI is above a detection threshold.

In another embodiment, a computer-implemented method for detecting gateways comprises generating, by a computer, one or more feature vectors for one or more caller Automatic Number Identifications (ANIs) based upon call data extracted for a plurality of calls, wherein each feature vector for each ANI is based upon: a number of calls from the caller ANI to each of the callees receiving the largest number of calls normalized by a calls threshold, a number of calls from the caller ANI to each type of callee receiving the largest number of calls, a lowest interarrival interval between consecutive calls, and a network type of the caller ANI; generating, by the computer, for each respective caller ANI, a gateway score based upon an anomaly detection algorithm using the one or more feature vectors; detecting, by the computer, a gateway is associated with a caller ANI, in response to determining that the gateway score for the caller ANI satisfies a detection threshold.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
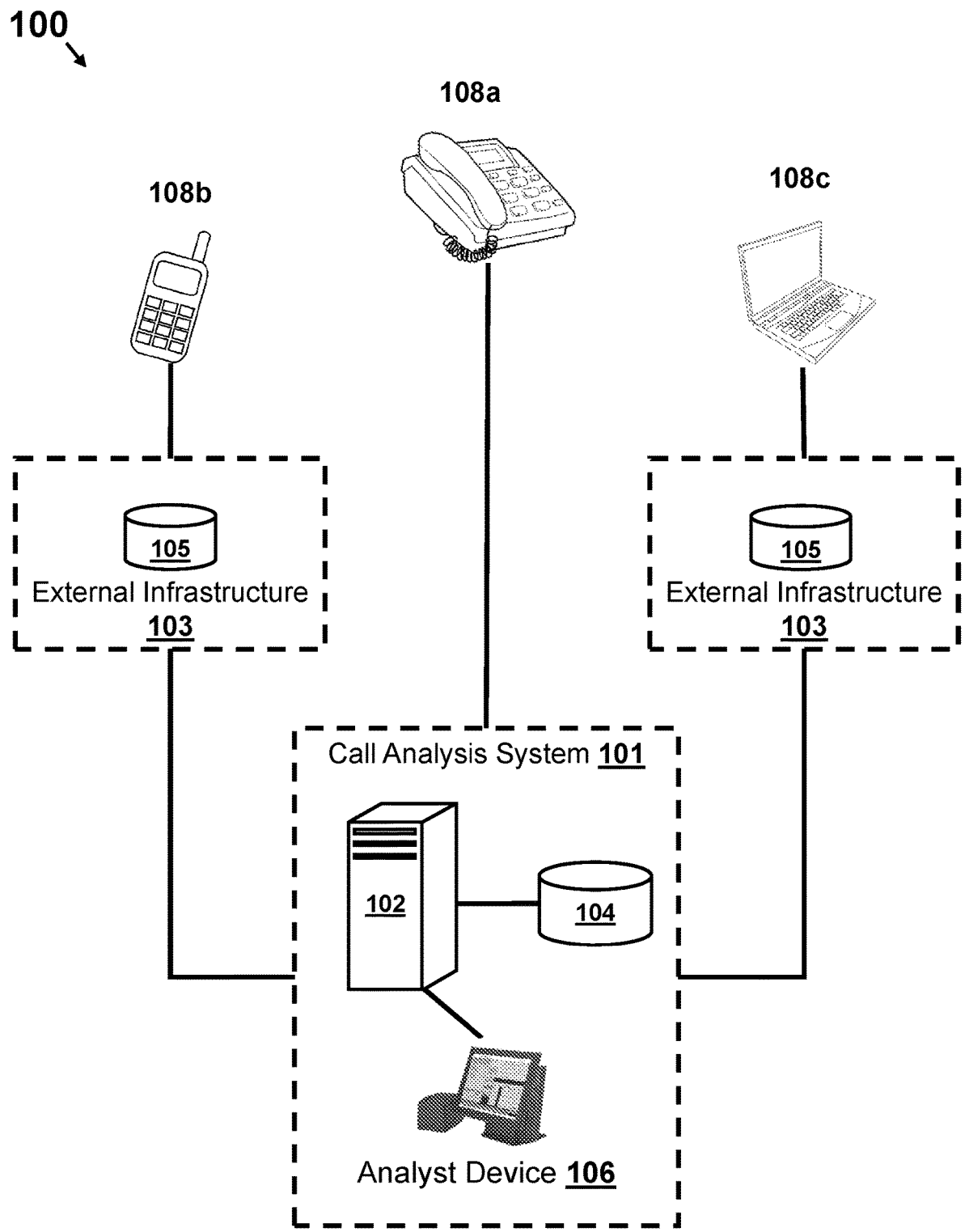
FIG. 1 shows components of a system for gateway detection, according to an exemplary embodiment

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are to be considered within the scope of the invention.

I. Components of Exemplary System

FIG. 1 shows components of a system 100 for gateway detection, according to an exemplary embodiment. The exemplary system 100 may comprise a call analysis center 101, an external infrastructure 103, and caller devices 108. A call analysis center 101 may comprise an analytics server 102, a central database 104, and a client computer 106, and external infrastructures 103 comprise a call data appliance 105. It should be understood that the components of the system 100 are merely illustrative. One having skill in the art would appreciate that other embodiments may include additional or alternative components, or omit components, from the components in the exemplary system 100, but are still within the scope of this disclosure.

The various components of the call analysis system 100 and external infrastructures 103 may be connected with each other via hardware and software components of one or more networks. Examples of a network include, but are not limited to, Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols.

It should be appreciated that FIG. 1 is merely one example of the devices of a system 100. Although FIG. 1 only shows an exemplary system 100 embodiment having only a few of the various components, it should be appreciated that embodiments may comprise, be coupled to (via one or more networks), or otherwise implement any number of devices capable of performing the various features and tasks described herein. Some embodiments may incorporate databases 104 into an analytics server 102, such that these features are integrated within a single device. In a similar example, some embodiments may incorporate an client computer 106 into an analytics server 102, such that a single computing device performs the features and tasks of such devices. One having skill in the art will appreciate that other embodiments may comprise additional or alternative devices, or may omit devices shown in FIG. 1, and that such alternative embodiments still fall within the scope of this disclosure.

A. Organization of Infrastructures

A network infrastructure 101, 103 may comprise computing devices that collect call data generated from phone calls between the calling devices 108 and a call center or other personnel in the infrastructure 101, 103, and stores the incoming call data into a storage medium or a central database 104. An analytics server 102 may execute various operations described herein, such as querying or updating a central database 104, pre-processing or otherwise conditioning the call data, executing various analytics on call data, a exchanging various forms of data with various devices of the system 100 via one or more networks.

As seen in the exemplary system 100, a particular infrastructure 101, 103 may function as a call analysis system 101 that offers call analytics services to external infrastructures 103, which may owned or operated by customers of an analytics service or sub-components of a larger organization. An external infrastructure 103 has a data appliance 105 configured to collect and store call data generated from phone calls between calling devices 108b, 108c and the particular external infrastructures 103. The data appliances 105 may transmit the call data collected at the external infrastructures 103 to the call analysis system 101 to perform various analytics services.

A call analysis system 101 may comprise an analytics server 102 and data appliances 105. The data appliances 105 may store call data received from external infrastructures 103, or otherwise generated from telephone calls between the call analysis system 101 and calling devices 108a. The analytics server 102 may execute various processes tasks on the call data accessible to the call analytics system 101, such as call data stored in the data appliances 105 or call data received directly from data appliances 105. The analytics server 102 may transmit outputted data, such as analytics results, analytical models, and other data updates, to each of the external infrastructures 103, which may then be stored in the data appliances 105. Additionally or alternatively, the analytics server 102 or another device of the call analytics system 101 may make the central database 104 available to data appliances 105 to query, or may publish certain output data to a website, web portal, FTP site, or other externally accessible databank that is accessible to the external infrastructures 103. In some implementations, the call analytics system 101 may tailor some or all of the output data and processes to particular external infrastructures 103. For instance, the output data published by the call analytics system 101 may include a real-time indication of a detected gateway or batch updates listing detected gateways that may be stored in one or more databases 104.

It should be appreciated that some embodiments may include only a single organizational enterprise infrastructure, such that an entity may implement an analytics server 102 for internal analytics purposes on call data received by the entity. In such embodiments, there may not be external infrastructures 103; or the external infrastructures 103 may be remote installations of the same entity. For example, the analytics server 102 may a part of an enterprise and may receive multiple incoming phone calls directed to the enterprise.

B. Exemplary Devices

An analytics server 102 may receive and analyze call data to detect whether a certain Automatic Number Identification (ANI) represents a gateway. An analytics server 102 may be any kind of computing device comprising a processor, memory, and software configuring the analytics server 102 to execute various processes and tasks described herein. Non-limiting examples of an analytics server 102 may include a server computer, a desktop computer, a laptop computer, a tablet computer, a smartphone, and any other type of computing device. The analytics server 102 may be coupled to one or more databases 104 and client computers 106 via one or more networks, allowing the analytics server 102 to communicate call data, database queries, and execution instructions (e.g., execution parameters, triggering inputs, query parameters), among other machine-readable computer data and configurations, with other components of the system 100.

An analytics server 102 may receive, and in some cases extract, call data from phone calls involving caller devices 108, including calls that a caller device 108 makes or receives. When the end-user of a caller device 108 makes or receives a phone call to a call center 101, a server 102 or database 104 captures the audio signals and call data related to that call. That call data is then transmitted to the analytics server 102 or service data appliances 105; the call data may be transmitted at a regular interval, in response to a triggering event, or in response to query received from the analytics server 102. Non-limiting examples of call data may include data records or fields indicating: a duration of the call, an ANI (or phone number) a phone call originates from; a type of ANI for an associated protocol (e.g., VoIP, cellular phone number); an ANI or phone number of a caller device 108; timestamps for various states of the call; a gateway indicator that an ANI has been determined to be a gateway; a callee identifier, for a particular user or a call center 101; a type of callee (on a call center 101); and any other data associated with the call. It should be appreciated that "call data," as used herein, includes data that could be characterized as metadata rather than data, depending on the data formatting specifications of various devices, protocols, organizations, and telecommunications protocols.

The analytics server 102 may query and receive data from a database 104 received from various data sources, such as call centers 101, according to various query parameters and configurations. These parameters and configurations may include, for example, timing constraints on the call data and threshold value constraints, among others.

In particular, call data comprises a timestamp field indicating when the call was received at a call center 101, or some similar field indicating when the call data was otherwise generated in a database 104 or in some other data source. The analytics server 102 or data appliances 105 may execute a query for call data having a timestamp that is within a given time window (sometimes referred to as a "lookback window") threshold, which can be configured by a user (e.g., call center personnel, fraud analyst) via GUI on a client computer 106, or otherwise preconfigured. The lookback window may be adjusted to ingest an amount of call data that provides a sufficiently representative population size but does not overwhelm resources. For instance, a window that is too small may not capture a sufficiently large population of calls; or the window may contain an unusual burst of calls from a particular ANI that consequently misrepresents that ANI's calls density. Examples provided in this disclosure implement a thirty-day lookback window in order to smooth "bursty" callers while not requiring too much data for components of the system 100 to handle. Additionally, because ANIs may be reassigned to different entities or individuals over time, the gateway determination for a particular ANI may be outdated. As such, the lookback window may also be adjusted accordingly in order to account for changes to the gateway statuses of certain ANIs. Similarly, it may be desirable to "refresh" the gateway determinations and the call data used in various processes. At a given refresh time interval, the analytics server 102, or some other component of the system 100, may download or otherwise update the call data in the database 102. In the exemplary system 100, for example, the analytics server 102 or database 102 implements both of the above-discussed timing constraints (i.e., lookback window, refresh interval), where the lookback window is thirty days and the refresh time interval is fifteen days. In this example, every fifteen days, the analytics server 102 or database 102 updates the call data or other process-related data with call data having timestamps within thirty-days. It should be appreciated that implement additional or alternative parameters or constraints may be implemented for collecting call data from various data sources, such as one or more databases 102.

In some embodiments, the analytics server 102 may manage and operate an in-memory dictionary (or in-memory database), which stores call data collected from the database 102 and output data in the memory (e.g., RAM) of the analytics server 102. The analytics server 102 may collect, or otherwise receive, various forms of data from the database 102 and store the data into the in-memory dictionary.

An analytics server 102 may execute one or more processes (e.g., a query of a database 104, a rule-based processes, a machine learning processes, combined processes) for detecting gateways and related-processes, such as gathering, processing, and analyzing call data. In some instances, a data appliances 105 may store operational data that is used by the analytics server 102 to determine whether an ANI of prior calls or real-time calls (e.g., ongoing calls, incoming calls) are associated with gateways. The analytics server 102 then uses those gateway determinations in downstream operations, such as caller authentication and reporting results to customers (e.g., external infrastructures 103).

In some embodiments, the analytics server 102 may execute a gateway detection algorithm implementing a rules-based approach to identify and detect ANIs associated with gateways (sometimes referred to as "gateway ANIs") in call data of prior calls or in real-time. The analytics server 102 receives call data records containing various data fields containing values for particular phone calls (sometimes referred to as "features"), such as the ANIs caller devices 108a. Using the data in the call data, the analytics server 102 identifies and calculates various statistical outputs for the various ANIs represented in the call data. In particular, the analytics server 102 identifies or calculates, for each of the ANIs, one or more features (i.e., data values) that include a volume, a spread, and a diversity, among others.

A volume feature of an ANI is a value score calculated to represent the total number of calls involving the ANI. Because multiple callers will be placing phone calls from a gateway, an ANI representing a gateway (sometimes referred to as a "gateway ANI") will typically have a higher volume of calls. The analytics server 102 may determine that an ANI is a gateway if the volume of the ANI satisfies a volume threshold that indicates a low likelihood that the ANI is used by one person or a household and high likelihood that the ANI is used by multiple callers or for business and marketing purposes.

A spread feature of an ANI is a value score calculated to represent the total distinct callees (e.g., call center personnel) or callee telephones that are involved in phone calls with the ANI; it represents the number (or spread) of individuals in contact with the ANI. A gateway ANI is often in contact with a larger number of distinct individuals. The analytics server 102 may determine an ANI represents a gateway if the number of distinct of callees for the ANI satisfies a spread threshold that indicates a low likelihood that the ANI is used by one person or a household and high likelihood that the ANI is used by multiple callers or for business and marketing purposes.

A diversity feature of an ANI is a value score calculated to represent the number of different callee types, where the "types" of callees refer to one or more distinct characteristics among a variety of different categories, such as business verticals (e.g., engineering, legal), industries (e.g., insurance, banking, automotive, retail), or entity (e.g., commercial, non-profit, private or residential, government), among other types of categories. The call data for the ANIs may contain data fields comprising values that expressly indicate type-information to the analytics server 102, or the analytics server 102 may be pre-configured to determine the type-information based on the available data values and fields. As with the spread, a gateway ANI is often in contact with a larger number of callee types compared to private ANI. The analytics server 102 may determine an ANI represents a gateway if the number of callee types for the ANI satisfies a diversity threshold that indicates a low likelihood that the ANI is used by one person or a household and high likelihood that the ANI is used by multiple callers or for business and marketing purposes.

The threshold values may be entered and refined by a user during configuration of the analytics server 102. A client computer 106 may comprise a graphical user interface (GUI) allowing the user to configure the various algorithms executed by the analytics server 102, including entering the initial thresholds and weights, and refining the thresholds and weights over time. In some embodiments, the analytics server 102 may be configured to automatically and dynamically refine the various thresholds and algorithmic weights over time.

The analytics server 102 uses the features extracted from the call data to generate a rules-based gateway score for each of the ANIs in the call data. The analytics server 102 determines whether an ANI represents a gateway based on whether the ANI's gateway score satisfies or fails a gateway threshold. It should be appreciated that additional or alternative features may be used in the rules-based approach. Similarly, it should be appreciate that the features mentioned above may be used as feature-inputs for the machine-learning algorithms that classify gateway ANIs described below.

In some cases, the analytics server 102 may assign weight values to one or more feature values, which may be entered by a user at run-time or pre-configured by the user. The weights may be refined by the user to increase or decrease the impact of a particular feature when determining gateway scores. This may be done for any number of reasons, such as client-tailoring or performance improvements.

In some embodiments, the analytics server 102 may execute a gateway detection algorithm implementing a machine-learning approach. The analytics server 102 receives call data containing features for the ANIs of caller devices 108. Using the features extracted from call data, the analytics server 102 generates gateway detection models using a machine learning algorithm and detects gateway ANIs in the call data using an anomaly detection algorithm. Although the processes and features of the embodiments described herein implement an isolation forest anomaly detection algorithm, it should nevertheless be appreciated that embodiments may implement any number of anomaly detection algorithms and techniques (e.g., Markov models, classification-based, clustering-based, density-based, distance-based) and still fall within the scope of this disclosure. Likewise, the various embodiments described herein implement an unsupervised machine-learning algorithm, but it should be appreciated that embodiments may implement a supervised algorithm, unsupervised algorithm, and a semi-supervised algorithm, and still fall within the scope of this disclosure.

In operation, the analytics server 102 extracts features from call data and generates a feature vector based on those values, using a machine learning algorithm. At a pre-configured refresh time interval, the analytics server 102 may extract or otherwise receive the call data from a data appliances 105 and extract the features for the ANIs. The call data extracted from the data appliances 105 have timestamps that satisfy a lookback window (e.g., within thirty days) constraint. The feature vector is based on one or more features extracted, which in some case may include the features previously discussed. In the exemplary system 100, the features extracted include a set of top client calls, a set of top callee-type calls, a set of smallest interarrival calls, and ANI type. And in some cases, the ANI type may be "one hot encoded," which one having skill in the art would appreciate is a machine-learning concept whereby a computer-executed process converts categorical variables or data into a format that can be provided to machine learning algorithms to improve prediction quality, processing capabilities, or overall performance. The features extracted for a particular ANI, and used in the isolation forest implemented by the analytics server 102, define a call profile of the ANI.

The analytics server 102 detects anomalies, representing gateways, using the isolation forest algorithm and based on the feature vector, the call profiles, and a contamination factor. The contamination factor is preconfigured in the analytics server 102; the contamination factor may be manually configured or refined by a user via GUI, or the contamination factor may be automatically generated or refined. In some implementations, the analytics server 102 may output an indication whether an ANI is a gateway. And in some implementations, the analytics server 102 may output a gateway score according to the machine learning algorithm.

In some embodiments, the analytics server 102 may execute a gateway detection algorithm implementing both a rules-based approach and a machine-learning approach, whereby the analytics server 102 executes a combining algorithm that combines the results of the rules-based algorithm and the machine-learning algorithm. In such implementations, the analytics server 102 combines the outputted scores or classification results from both the rule-based and machine learning-based methods into a single combined gateway score and classification output. The analytics server 102 determines whether an ANI represents a gateway based on whether the ANI's combined gateway score satisfies or fails a combined gateway-threshold.

In some implementations, an analytics server 102, or other computing device of the system 100 (e.g., data appliances 105), authenticates a caller based on multiple authentication factors, such as call data associated with the phone call and caller device 108 (e.g., gateway determination status, ANI, call features), and other caller-related or organization-related information provided by the caller. In such implementations, the analytics server 102 executes an authentication algorithm that accounts for the various data and information gathered to determine whether to authenticate the caller or caller device 108. The analytics server 102 may, for example, generate a risk score that is compared against a risk score threshold; where a caller or phone call from a caller device 108 is authenticated when the risk score satisfies a risk threshold, and the caller or the phone call is blocked, disconnected, or otherwise rejected, when the risk score fails to satisfy a risk threshold. The determination that the ANI of the caller device 108 is a gateway may increase the likelihood the call's risk score fails the risk threshold according to the authentication algorithm. Likewise, where the ANI is not a gateway, it may be more likely that the call's risk score satisfies the risk threshold according to the authentication algorithm.

In some implementations, an analytics server 102, or other computing device of the system 100 (e.g., data appliances 105), authenticates a caller or caller device 108 based on only a subset of data fields in a database 104. In such implementations, the analytics server 102 may query one or more data fields or computing files (e.g., blacklists, whitelists), including an indicator of whether the ANI of the caller device 108 is a gateway. The authentication determination may be based on whether the certain data fields contain expected data, where the data field evaluation may be simultaneous or sequential, such that the analytics server 102 proceeds onward to evaluate a second data field when the caller device 108a fails a first data field challenge. For example, the call analysis system 101 may implement a blacklist of ANIs to reject or whitelist of ANIs to permit, or otherwise query a gateway status determination field, to determine whether a call is coming from a gateway. In this example, the analytics server 102 determines whether to authenticate a particular caller device 108a, based on stored data indicating whether the ANI of the caller device 108a (e.g., database record, blacklist, whitelist) is a gateway. It should be appreciated that, in some implementations, the analytics server 102 may execute a combination of the above algorithmic authentication methodology and field-determination authentication methodology.

In some circumstances, an enrolled caller (or an otherwise known caller) might be call an external infrastructure using a caller device 108b having ANI for a gateway. In such circumstances, the analytics server 102 (or other authentication device) should be configured to execute an algorithmic methodology, a field-determination methodology, or a combination thereof, accounting for this possibility, thereby avoiding "false positives" or incorrect failed authentications. When executing an authentication algorithm, for instance, the analytics server 102 may be configured to exclude the gateway status of the ANI from an authentication algorithm. When querying data fields or files for filed-determination authentication, the analytics server 102 may be configured to query alternative data fields or require certain information from the caller.

The analytics server 102 may update blacklists and whitelists for call authentication purposes by various servers 102. Additionally or alternatively, the analytics server 102 stores the gateway determinations into a data appliances 105, where call data in the data appliances 105 is updated to indicate those ANIs that are gateways. In some cases, the analytics server 102 may not use an ANI determined to be a gateway for authentication purposes. In such cases, because there will be multiple callers associated with the gateway ANI, the ANI is not a reliable unique identifier for the caller. In some cases, if the analytics server 102 determines that an ANI is associated with a gateway, in order to avoid a "false positive" the analytics server 102 may not blacklist the ANI even if there may be multiple phone calls or callers from the ANI. Although these calls may otherwise suggest a fraudulent pattern of behavior, but some gateway ANIs may have the same behavior despite not being used for fraud. It should be understood that the aforementioned usage of the determination of whether an ANI is gateway is merely illustrative and the determination may be used by other authentication processes or any other processes.

Data appliances 105 are operated by customers or sub-components of the call analysis service, which may communicate via one or more networks with components of the call analysis center 101. In particular, the data appliances 105 may transmit call data generated by the external infra-structures 103 to the call analysis system 101; and may receive data outputs and results from the call analysis system 101. It should be appreciated that data appliances 105 may be any computing device comprising memory, a processor, and software that are configured for various features and tasks described herein. Non-limiting examples data appliances 105 may include a server computer, laptop computer, desktop computer, and the like.

A central database 104 may store, update, manage, and query various types of data accessible to, and for use by, components of the system 100; including call data for phone calls. A database 104 may be hosted on any computing device comprising a processor, memory, and software capable of performing the various tasks and processes described herein. In some implementations, a database 104 may be integrated into a single computing device with other components of the system 100, such as a server 102. And in some implementations, as in FIG. 1, a database 104 may be hosted by a distinct computing device, and may be in communication with servers 102 via one or more networks.

A central database 104 may store call data related to calls for phones and operational data related to algorithmic models (e.g., machine-learning models, rule-based models, combined models). A database 104 may also store output data results generated by the various processes. Non-limiting examples of the data stored in a database may include algorithmic models, labeled data sets, ANIs detected to be gateways, prefixes of ANIs determined to be ANIs, ANIs determined not to be gateways, blacklists (ANIs that automatically fail authentication), and whitelists (ANIs that are automatically authenticated), among other forms of call data, output data results, and other operational data. In some embodiments, a data appliance 105 of an external infrastructure may include a database.

A data appliance 105 may intercept and store call data, among other types of data, received from any number of data sources, where such data sources may include call data generated during phone calls between a caller device 108a and the call analysis system 101; and call data that is generated and/or extracted from a data stream by the data appliance 105, during calls between caller devices 108b, 108c and an external infrastructure 103. The analytics server 102 may query or receive data from the data appliances 105 at a given interval or in response to a triggering instruction, such as a user instruction or receiving incoming call data. In some instances, data may be published by the data appliances 105 or analytics server 102 to one or more data appliances 105 or otherwise published to a private webpage accessible to customers operating the external infrastructures 103.

In some implementations, the central database 104 may be configured to function as a data mart or date lake that operates a repository for all data records across the system 100, including call data received from one or more enterprise infrastructures 101, 103. Call data and computing files may be stored in any number of formats, and may include structured or unstructured data, and may be accessible and manageable by an analytics server 102 or client computer 106. When executing a query, the central server 104 or analytics server 102 may transform, construct, or otherwise format the queried data according to formatting specification requirements for a process being executed by another device of the system 100.

A client computer 106 may be employed by users (e.g. fraud analysts, administrators) to configure an analytics server 102 and data appliances 105 to conduct various analytics processes, generate data outputs, and customer service efforts. A client computer 106 may be any computing device comprising memory, a processor, and software configured for various features and tasks described herein. Non-limiting examples a client computer 106 may include a server computer, laptop computer, desktop computer, a tablet computer, and the like. A client computer 106 may be coupled via one or more networks to the analytics server 102 and central database, allowing the client computer 106 to communicate instructions (e.g., database queries, modeling instructions) to an analytics server 102, or data appliances 105 related to various data-gathering, call analysis, and gateway detection processes, including various tasks and processes described herein. The client computer 106 may transmit instructions and configuration parameters to an analytics server 102 for executing certain processes, and to one or more databases 104 for accessing (e.g., querying), updating, or otherwise managing call data for the system 100.

It should be appreciated that, in embodiments of this disclosure, certain functions and features described as being executed by the client computer 106 may, in other embodiments, be executed by other devices, such as an analytics server 102. In some embodiments, for example, the analytics server 102 and the client computer 106 may be the same computing device. Moreover, this disclosure describes embodiments implementing a cloud-based environment that organize the client computer 106 and analytics server 102 in a client-server arrangement, where the client computer 106 provides a user graphical user interface (GUI) for managing and executing various administrative processes. But other embodiments may have the client computer 106 perform the various call data analysis tasks and processes. In such embodiments, the analytics server 102 is configured to receive instructions for, and distribute data-outputs related to, administrative or collaborative features, such as sharing outputs, data sets, and results with customers' external infrastructures 103.

A client computer 106 may have locally stored native software associated with the system 100 that communicated with the analytics server 102; or the client computer 106 may interact with the analytics server 102 via a browser-based web-portal. The client computer 106 may present a user with a graphical user interface (GUI) (sometimes referred to herein as a "call workspace") allowing the user to interact with the analytics server 102. The GUI may be configured to display various execution options for providing instructions and parameters to the analytics server 102, as well as the various inputs and outputs transmitted to and received from the analytics server 102. In some cases, selectable options are based on data stored in the data appliances 105, which is accessible by and transmitted to the client computer 106 according to credentials or other identifying information for the user. In some implementations, after a detection process has completed, the analytics server 102 may send the outputs to client computer 106 for display via the GUI.

Caller devices 108 may be any communications or computing device that callers can use to place a telephone call to a destination employing various processes and tasks described herein. Non-limiting examples of caller devices 108 may include mobile phones 108*a* or landline phones 108*b*. Caller devices 108 are not limited to telecommunications-oriented devices (e.g., telephones), but may also include devices and software implementing VoIP protocols for telecommunications, such as computers 108*c*.

II. Exemplary Processes and Execution

A. Rules-Based Processes

Figure 2:
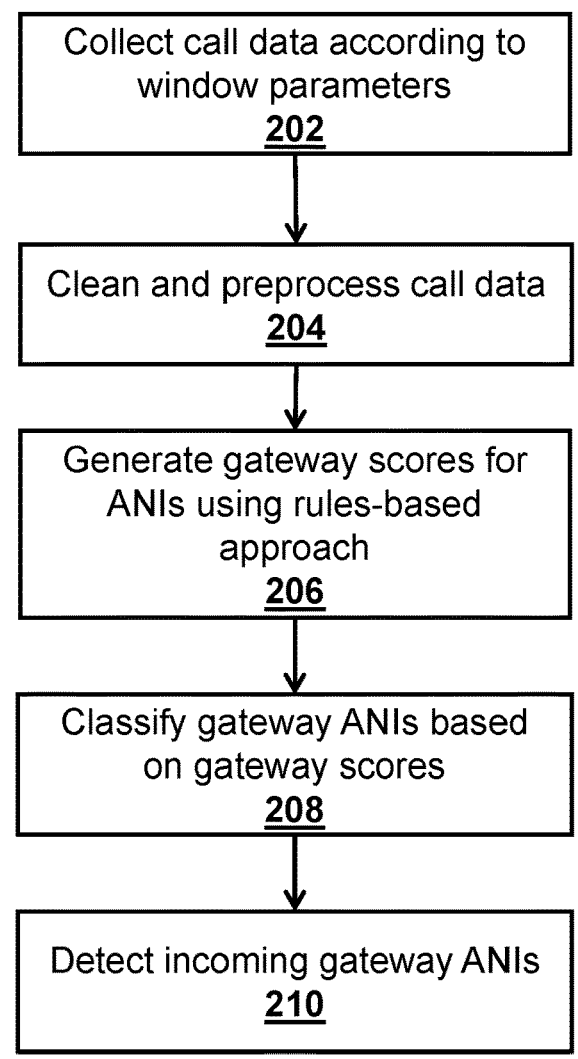
FIG. 2 is a flowchart showing execution steps of a rules-based approach for gateway detection, according to an exemplary method.

FIG. 2 is a flowchart showing execution steps of a rules-based approach for gateway detection, according to an exemplary method 200. Although the steps of the illustrative method 200 may be performed by multiple computing devices, the following details a single computer implementing the steps. It should also be understood that the steps shown and described herein are merely illustrative and additional, alternative, and fewer number of steps should be considered to be within the scope of this disclosure. Moreover, the example method 200 is described as being executed in "batch" processes at a given interval, but it should be appreciated that one or more steps may be implemented in real-time, such as gathering data, processing data, executing algorithms, and detecting gateway ANIs.

In a first step 202, a computer (e.g., analytics server) collects call data for ANIs from a database or one or more data sources, where the call data is associated with calls to one or more call centers. In some embodiments, to improve performance the computer may load, update, and manage all or most of the collected data in local memory. At a given refresh time interval, the computer is prompted to execute the exemplary method 200, which may begin with the current step 202 of collecting or refreshing the call data. Each collected data record contains a timestamp data field value that satisfies a lookback window query constraint. When training the model, the computer or other devices may track (e.g., receive, store) call data for phone calls over some period of time. Exemplary process 200 may then be executed when a threshold amount of call data has been received, and/or after a threshold amount of time has passed observing and tracking call data, such as refresh interval.

As mentioned, in some embodiments, the collection of call data for one or more calls may occur in real-time, such that the computer receives call data directly from call centers when new call data is generated or received from a call center, which may be associated with a new or ongoing call.

In optional step 204, the computer cleans and pre-processes call data received from various data sources as required. For instance, the computer may de-duplicate certain redundant data records. The computer may execute application programmable interfaces (APIs) that programmatically convert, reformat, or otherwise translate incoming certain data records formatted according to a data source's specification, into a specification expected and implemented by the computer. Additionally or alternatively, the computer may clean and pre-process the incoming call data by converting, reformatting, or otherwise translating certain data records of the call data to satisfy a model specification that is valid for the model, and then feed that call data into a machine learning-based model.

In a next step 206, the computer calculates the gateway score for each ANI using a rules-based algorithm. The computer identifies and extracts features for each ANI, where the features of ANI are calculated based on the values of certain fields in the data records of an ANI, as well as predetermined threshold values. For example, the features extracted for an ANI may include, without limitation, a call volume heuristic feature, a spread heuristic feature, and a diversity heuristic feature. Additional data values and features may be implemented used for various embodiments. The threshold values may be configured by a user via a GUI, or may be algorithmically determined based on various inputted feature values of the ANIs. The rules-based gateway score for each ANI may be some function of the feature values extracted for the particular ANI from the call data.

In step 208, using the gateway scores calculated for the ANIs, the computer compares the gateway scores against a predetermined gateway threshold, which may be configured by a user via a GUI. The computer classifies an ANI as a gateway ANI when the ANI has a gateway score that does not satisfy the gateway threshold.

In step 210, the computer detects gateway ANIs associated with new call data based on the outputs of the exemplary rules-based process 200. In some embodiments, the computer may update a database to include a gateway indicator for ANIs that have been classified as gateway ANIs, as described in the prior steps 202-208. In such embodiments, when the new call data is received for a new or ongoing call, the computer may simply refer to the database to determine whether the ANI associated with the new call data is a gateway ANI based on the gateway indicators.

In some embodiments, the computer may execute the exemplary process 200 in real time or near-real time. In such embodiments, the computer may dynamically update the values of the extracted features and the gateway scores for the incoming ANI, then compare the re-calculated gateway scores against the gateway threshold for classification as a gateway ANI or a non-gateway ANI. In some cases, it may be beneficial for the computer to load, query, update, and manage the data in-memory, rather than disk. Other techniques for detecting ANIs based on the outputted model may be employed, additionally or alternatively.

B. Machine-Learning Processes and Execution

Figure 3:
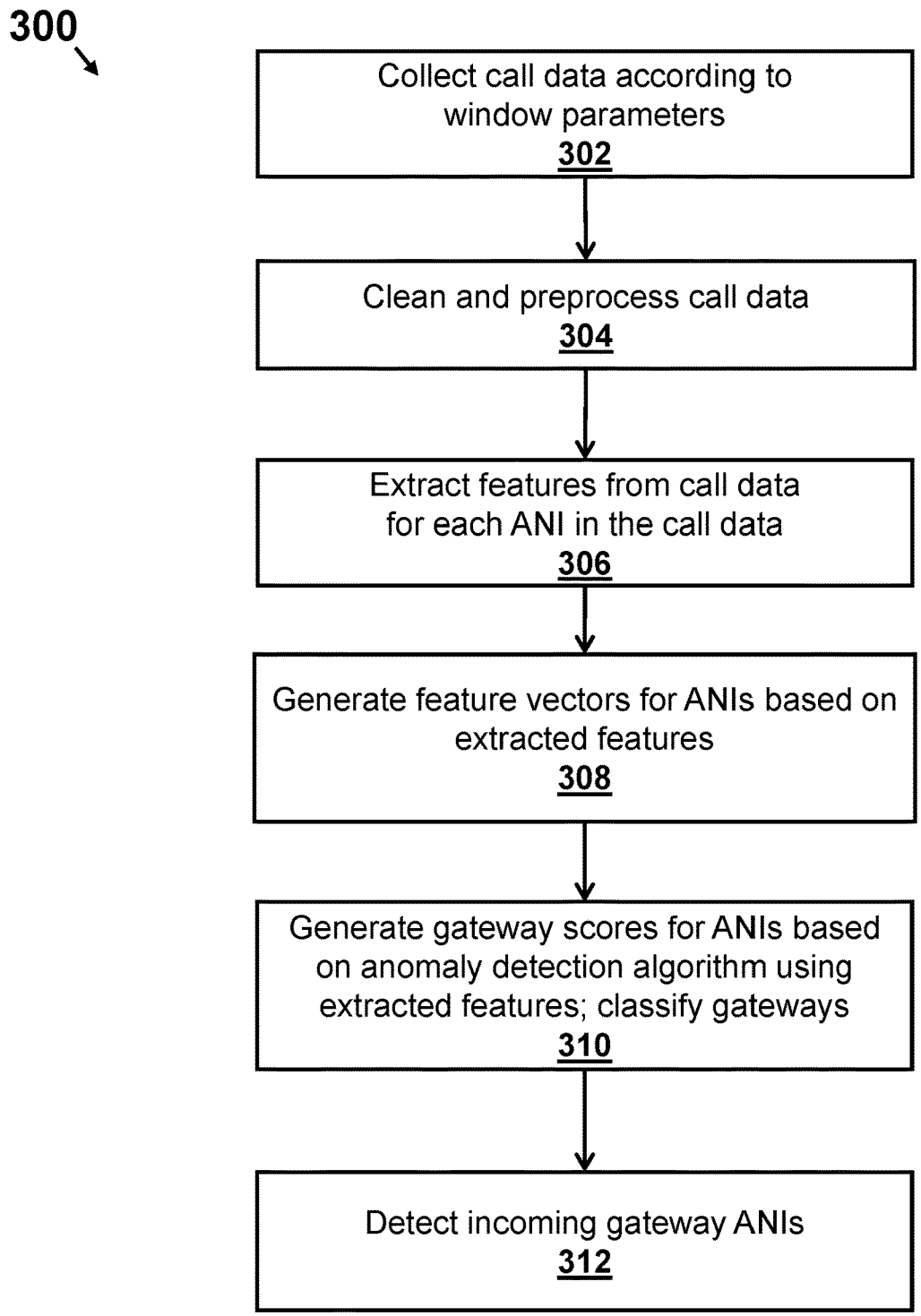
FIG. 3 is a flowchart showing execution steps of a machine learning approach for gateway detection, according to an exemplary method.

FIG. 3 is a flowchart showing execution steps of a machine learning approach for gateway detection, according to an exemplary method 300. Although the steps of the exemplary process 300 may be performed by multiple computing devices, the following details a single computer implementing the steps. It should also be understood that the steps shown and described herein are merely illustrative and additional, alternative, and fewer number of steps should be considered to be within the scope of this disclosure. Moreover, some aspects of the exemplary method 300 are described as being executed in "batch" processes at a given interval, but it should be appreciated that one or more steps may be implemented in real-time, such as gathering data, processing data, executing algorithms, and detecting gateway ANIs.

In a first step 302, a computer (e.g., analytics server) collects call data for ANIs from a database or one or more data sources, where the call data is associated with calls to one or more call centers. In some embodiments, to improve performance the computer may load, update, and manage all or most of the collected data in local memory. At a given refresh time interval, the computer is prompted to execute the exemplary method 300, which may begin with the current step 302 of collecting or refreshing the call data. Each collected data record contains a timestamp data field value that satisfies a lookback window query constraint. When training the model, the computer or other devices may track (e.g., receive, store) call data for phone calls over some period of time. Exemplary process 300 may then be executed when a threshold amount of call data has been received, and/or after a threshold amount of time has passed observing and tracking call data, such as refresh interval.

As mentioned, in some embodiments, the collection of call data for one or more calls may occur in real-time, such that the computer receives call data directly from call centers when new call data is generated or received from a call center, which may be associated with a new or ongoing call.

In an optional step 304, the computer cleans and pre-processes call data received from various data sources as required. For instance, the computer may de-duplicate certain redundant data records. The computer may execute application programmable interfaces (APIs) that programmatically convert, reformat, or otherwise translate incoming certain data records formatted according to a data source's specification, into a specification expected and implemented by the computer. Additionally or alternatively, the computer may clean and pre-process the incoming call data by converting, reformatting, or otherwise translating certain data records of the call data to satisfy a model specification that is valid for the model, and then feed that call data into a machine learning-based model.

In step 306, the computer executes one or more algorithms to extract features for each ANI from the call data. In the exemplary process 300, the computer identifies certain data fields containing data relevant for feature extraction, such as callee identifiers, callee types, and timestamps for the calls, among others. The computer calculates the features based on the values in these data fields.

For example, and without limitation, the features extracted for each ANI may include, a set of top customer calls received from an ANI; a set of top vertical calls from the ANI; the smallest interarrival calls received from the ANI; and an ANI-type of the ANI. In this example, the set of top customer (e.g., callees, external call centers, external call center personnel) contains the number of times the most frequently contacted callees received calls from the ANI, normalized by some manually or automatically determined normalization value, which the computer may determine, for example, according to the range of values observed across the ANIs. The set of top vertical (e.g., industry type of callee, business type of callee) calls contains the number of times the most frequently contacted callee-types received calls from the ANI, normalized by some manually or automatically determined normalization value. The "smallest interarrival calls" is the set of calls observed from the ANI having the shortest interval between consecutive calls. The ANI-type may indicate technical information about the ANI and caller device, such as the network type of the ANI (e.g., cellular, landline, VoIP). The ANI-type may be assigned based on the technical information observed for the ANI, according to a predetermined rule set (e.g., x for cellular, y for landline, z for VoIP), or according to a more sophisticated categorization algorithm (e.g., one hot encoding) configured to process and convert categorical data (e.g., strings) into numerical data (e.g., integers, binary).

Additional features may be implemented in other embodiments. The extracted features are used to define a call profile of an ANI, which the computer deploys for the anomaly detection algorithm (e.g., isolation forest).

In step 308, the computer generates feature vectors for each ANI based on the features extracted from the call data. In this example, the feature vector for an ANI is the top [X] customer calls; the top [Y] vertical calls; the smallest [Z] interarrival calls; and ANI-type, where X, Y, and Z are predetermined values indicating the sizes of the data sets. For instance, if the user enters ten, five, and ten, and the call is received from a landline, then for each ANI in the collected call data, the computer will generate a data structure (e.g., array) containing: the number of calls received by the ten most contacted customers (e.g., callees); the number of calls for the five most contacted types of callees, and the ten smallest intervals between calls received from a particular ANI by any of the customers.

In step 310, using the feature vectors calculated for the ANIs, the computer executes an anomaly detection algorithm (e.g., isolation forest) to generate an anomaly detection model for the ANIs and calculate gateway scores using the feature vectors and the anomaly detection model.

The computer classifies ANIs as a gateway ANI when an ANI has a gateway score that does not satisfy a threshold distance (gateway threshold), which may be a maximum-permissible difference between the gateway score and other gateway scores for other ANIs. The computer implements a contamination factor (e.g., 1%) that indicates the number of expected anomalies within the data (e.g., gateway scores generated based on feature vectors). For instance, a contamination factor of 1% indicates to the computer that 1% of the data will be anomalies (i.e., gateways), while 99% of the data will be non-anomalies (i.e., non-gateways). In this example, the gateway threshold distance is an algorithmically determined distance where 1% of the data (e.g., ANI gateway scores) is beyond some distance of the majority of the other data. An ANI is classified as a gateway ANI when the gateway score for the particular ANI has a distance that exceeds the gateway threshold. The contamination factor is preconfigured in the computer. In some cases, the contamination factor may be manually configured or refined by a user via GUI. And in some cases, the contamination factor may be automatically generated or refined by the computer.

In step 312, the computer detects gateway ANIs associated with new call data based on the data outputted by the machine learning approach. In some embodiments, the computer may update a database to include a gateway indicator for ANIs that have been classified as gateway ANIs, as described in the prior steps 302-310. In such embodiments, when the new call data is received for a new or ongoing call, the computer may simply refer to the database to determine whether the ANI associated with the new call data is a gateway ANI based on the gateway indicators.

In some embodiments, the computer may execute the exemplary process 300 in real time or near-real time. In such embodiments, the computer may dynamically update the values of the extracted features and the feature vector for the incoming ANI, re-execute the anomaly detection algorithm for classification, and determine whether the incoming ANI is a gateway ANI. In some cases, it may be beneficial for the computer to load, query, update, and manage the data in-memory, rather than disk. Other techniques for detecting ANIs based on the outputted model may be employed, additionally or alternatively.

C. Combined Processes and Execution

Figure 4:
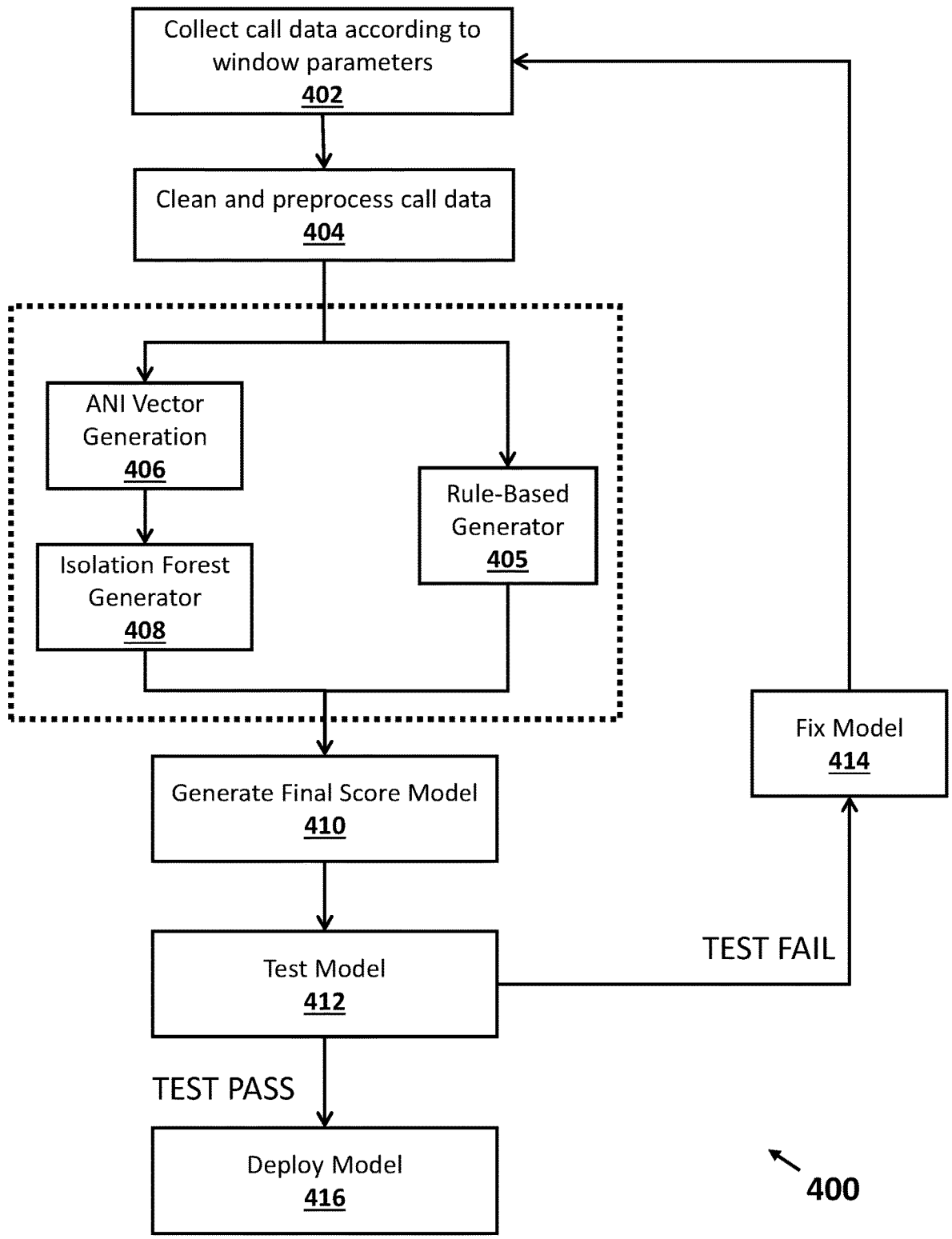
FIG. 4 is a flowchart showing execution steps for training and deploying models for gateway detection using combined approaches, according to an exemplary method.

FIG. 4 is a flowchart showing execution steps for training and deploying models for gateway detection using combined approaches, according to an exemplary method 400. Although the steps of the exemplary process 400 may be performed by multiple computing devices, the following details a single computer implementing the steps. It should also be understood that the steps shown and described herein are merely illustrative and additional, alternative, and fewer number of steps should be considered to be within the scope of this disclosure. Moreover, the exemplary method 400 is described as being executed in "batch" processes at a given interval, but it should be appreciated that one or more steps may be implemented in real-time, such as gathering data, processing data, executing algorithms, and detecting gateway ANIs.

In a first step 402, a computer (e.g., analytics server) collects call data for ANIs from a database or one or more data sources, where the call data is associated with calls to one or more call centers. In some embodiments, to improve performance the computer may load, update, and manage all or most of the collected data in local memory. At a given refresh time interval, the computer is prompted to execute the exemplary method 400, which may begin with the current step 402 of collecting or refreshing the call data. Each collected data record contains a timestamp data field value that satisfies a lookback window query constraint. When training the model, the computer or other devices may track (e.g., receive, store) call data for phone calls over some period of time. The exemplary process 400 may then be executed when a threshold amount of call data has been received, and/or after a threshold amount of time has passed observing and tracking call data, such as refresh interval.

As mentioned, in some embodiments, the collection of call data for one or more calls may occur in real-time, such that the computer receives call data directly from call centers when new call data is generated or received from a call center, which may be associated with a new or ongoing call.

In an optional step 404, the computer cleans and pre-processes call data received from various data sources as required. The computer may execute application programmable interfaces (APIs) that programmatically convert, reformat, or otherwise translate incoming certain data records formatted according to a data source's specification, into a specification expected and implemented by the computer. Additionally or alternatively, the computer may clean and pre-process the incoming call data by converting, reformatting, or otherwise translating certain data records of the call data to satisfy model specifications that valid for the models, and then feed that call data into a rule-based modeling algorithm and a machine learning-based modeling algorithm.

In a next step 405, the computer extracts features and executes a rules-based algorithm to generate a rules-based model. To generate a rules-based model, the computer may execute, for example, the previously-discussed example method 200. The computer may utilize rules on the volume of the calls made from an ANI, spread of calls, and the diversity of calls. As a simplified example of extracting features for each ANI to establish the rules-based model:

volume=1.0−$W_{vol}$*$f$(total_calls)/$f$(calls_threshold); where $W_{vol}$ is the weight for the volume heuristic feature; where calls_threshold represents the number of calls that saturates the volume feature; and where $f(x)=x^2$ is the function for transforming the call volume feature for the ANI.

volume=max(0.0, volume); where max(x, y) is a function identifying the maximum value between the values of x and y.

spread=1.0−$w_{spread}$*g(total_callees)/g(callee_threshold); where $W_{spread}$ is the weight for the spread heuristic feature; callee_threshold represents the number of callees that saturates the spread feature; and where $g(x)=x^2$ is the function for transforming the call spread feature.

spread=max(0.0, spread); where max(x, y) is a function identifying the maximum value between the values of x and y.

diversity=1.0−$W_{div}$*has_diversity(callees, callees_verticals); where $W_{div}$ is the weight for the diversity heuristic feature; and where has_diversity(x, y) is a binary-result function determining whether calls are diverse (e.g., across different industry verticals). If the callees for the ANI are "diverse" (e.g., across some number of industry verticals), then then function returns 1; but if the callees are not diverse (e.g., within some number of industry verticals), then the function returns 0.

score$_{rule}$=1.0−volume*spread*diversity is_gateway=True if score$_{rule}$>=gateway_threshold$_{rule}$, else False; where is_gateway is binary or Boolean assessment of whether an ANI is a gateway; and where gateway_threshold$_{rule}$ is the threshold used when determining whether the ANI is a gateway.

In step 406, the computer extracts features for the ANI sand generates a feature vector for the features of the ANIs. A simplified example of the feature vector generated is: <Top X Client Calls Normalized by calls_threshold, Top Y Vertical Calls Normalized by calls_threshold, Smallest Z interarrival calls Normalized by time_threshold, ANI Type One hot encoded>; where Top X Client Calls are the calls to each callee ordered by the quantum of calls, Top Y Vertical Call are the calls to each vertical, Smallest Z interarrival calls are the interarrival times for consecutive calls from an ANI in ascending order, and ANI Type is the network type for an ANI (e.g., cellular, landline, VoIP).

The calls_threshold value is used to normalize the values of the features for the ANIs. One having skill in the art would appreciate that any numerical value or normalizing algorithm may employed to normalize the feature values of the ANIs, such that the values of the features are brought within a common, normalized range. For example, the features of the ANIs range between zero and some maximum value among the ANIs. The feature values could be normalized as a fractional amount based on the maximum value.

In step 408, the computer executes an anomaly detection algorithm, which is an isolation forest in the exemplary process 400, to generate a gateway score ($score_{ml}$) for the ANIs. The computer may generate an isolation forest model to detect anomalies (i.e., gateways) using the gateway scores of the ANIs. The computer may use a contamination factor (e.g., 5%), such that the number of anomalies detected may be based upon the contamination factor applied to the gateway scores or feature vectors. In this example, 5% of the ANI gateway scores are anomalous (e.g., 5% of the ANIs are gateways).

In step 410, the computer may generate a final score model based upon the previously generated rule-based model (generated by executing step 405) and the previously generated machine learning model (generated by executing prior steps 406, 408). For example, the computer may linearly combine the machine learning based score and the rule based score to generate the final model score. As a simplified example, the computer may execute the following weight-based function: $score_{comb} = (W_{rule} * score_{rule}) + (W_{ml} * score_{ml})$, where $W_{rule}$ is a weight given to the rule-based algorithm and $W_{ml}$ is a weight given to the machine learning algorithm, and where the sum of $W_{rule}$ and $W_{ml}$ is 1.0. The computer determines whether an ANI represents a gateway based on whether the ANI's combined gateway score ($score_{comb}$) satisfies or fails a combined gateway-threshold.

In step 412, the final model may be tested to verify that the model is stable to be deployed. An administrative user may use a testing software executed by the computer to provide various test inputs to the final model to verify that the model generates expected output. For instance, the user may provide test data to the computer, which executes each model in sequence, to confirm whether the final model outputs an expected combined score ($score_{comb}$) and detects an ANI, known by the user, to be a gateway. Additionally or alternatively, performance, output quality, and volume of outputs may be assessed and tested to confirm the models provide sufficient performance, efficiency, and quality (trustworthy) results.

In step 414, if the final model causes the computer output an unexpected combined score, then the model failed the test, at which point the model is fixed and retrained by re-executing one or more previous training steps 402-410 of the exemplary process 400. The computer and models may be retrained by adjusting the input values, query parameters and constraints, and one or more threshold values. The model may also be adjusted if performance, output quality, or volume of outputs is poor or overwhelming on system resources. The computer and models may be retrained by adjusting the input values, query parameters and constraints, and one or more threshold values to improve or otherwise cause preferable performance, efficiency, or quality (trustworthy) results.

In step 416, if the final model causes the computer output the expected combined score, then the model passed the test, at which point the computer deploys the final model for use or consumption by one or more downstream processes, such as real-time detection of a gateway ANI during an ongoing or incoming telephone call. The computer may also store the final model into one or more databases. The computer may also store into a database one or more gateway indicators, weights, or other operational data and outputted data results.

D. Additional or Alternative Gateway Detection Processes

A computer executing the various gateway detection algorithms may have insufficient or non-existent data indicating how to classify an incoming ANI. For example, in many implementations, after a collection of ANIs have been classified according to the rules-based approach and/or the machine learning approach, the computer will update a database with indicators of which ANIs are gateways, and in some cases which ANIs are non-gateways. When the computer receives an incoming ANI for a recent or ongoing call, the computer will query the database to identify the gateway indicator for the incoming ANI. But the incoming ANI may be an "unfamiliar ANI," which is an ANI the computer has never seen before or for which there is insufficient call data for the computer to confidently classify the incoming ANI. In such cases, the computer may implement the various processes provided for below.

The processes described below may also be implemented in addition, or as an alternative, to the previously described processes. For example, the computer may implement one or more of the processes below to test or confirm the outputs of the rules-based or machine learning approaches; or certain processes below may be implemented based on available computing resources or performance requirements.

A. Gateway Prefix Refinement

In some embodiments, a computer (e.g., analytics server) executes a "refinement" process assessing the ANI-prefixes to identify additional gateways not detected in an algorithmic approaches. After the computer has executed one or more processes generating gateway classification predictions/detections, the computer counts the number of ANIs sharing a common ANI-prefix (e.g., the first n digits of the ANI phone number) from the ANIs not determined to be a gateway from the prior processes. The computer identifies prefixes matching gateway ANIs above a certain threshold (e.g., the first n digits) as gateway prefixes. The computer then marks (e.g., updates a gateway indicator) each ANI having a portion of numbers matching a gateway prefix as a gateway ANI. The computer stores into the database or other storage medium destination the gateway prefixes and any newly identified gateway ANIs. The number of prefix digits (n) of an ANI identifying gateway prefixes may be entered by a user via GUI, which thereby configures the computer to detect both gateway prefixes and additional gateway ANIs.

B. Simultaneous Calls

In some embodiments, a computer may detect gateway ANIs based on identifying simultaneous calls from a gateway ANI. Unlike regular ANIs (e.g., household phones, personal cell phones), gateway ANIs can be associated with multiple simultaneous calls. The computer may detect from call data, for a real-time/ongoing call or prior call, overlapping timestamps, such as Start UTC (coordinated universal time) and End UTC, in the call data collected across one or more customer external databases. The computer may generate a list of gateway ANIs for ANIs that overlap during calls to a single customer or across multiple customers.

C. Similarity Engine

In some embodiments, the computer may execute a similarity engine for detecting new gateway ANIs. In an anomaly detection algorithm, the computer is identifying the ANIs having data points that are different from the majority of the ANIs. The computer has nothing to define a value indicating specific similarity to a known gateway. Because anomaly detection described above is unsupervised, the computer knows that, e.g., 1% of the ANIs are gateways, and then detects the top 1% anomalies in the data set. But in the similarity approach, the computer has a list of known gateway ANIs, so the computer can determine a more specific similarity score that indicates with more precision whether a new ANI is close to the feature vector of particular known ANI features. This may have a more "streamlined" or less resource intensive benefit; and may provide for a quicker and easier implementation for smaller datasets. In such embodiments, the computer may execute a similarity engine that generates a similarity score for new ANIs based on features of known gateway ANIs. Using a set of known gateway ANIs, the computer may generate a feature vector for each of those gateway ANIs. When a new ANI is received, the computer compares the common features and generates a similarity score between the new ANI and one or more known gateway ANIs. If the similarity score indicates there is a threshold similarity, the new ANI is detected as a gateway; likewise, if the similarity score does not satisfy a threshold similarity, it may be uncertain, but the similarity score outputted by the computer can help a user make the determination.

E. Voice Biometrics

In some embodiments, the computer uses voice biometrics to identify one or more distinct speakers associated with an ANI. As described in U.S. Pat. Nos. 10,362,172 and 10,027,816, which are incorporated herein in their entirety, a computer may receive an audio signal associated with a caller to identify the caller. For each signal received during calls associated with an ANI, the computer may distinguish between different users, to determine a count of distinct callers associated with the ANI. If the computer determines that the number of distinct callers exceeds a threshold, then the computer may determine the ANI is a gateway, or include determination into one or more models with increased weight.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for detecting gateways, the method comprising:
   obtaining, by a computer, call data of a plurality of prior calls associated with a plurality of automatic number identifications (ANIs);

for each ANI of the plurality of ANIs:
  extracting, by the computer, a plurality of features from one or more prior calls associated with the ANI of the plurality of prior calls;
  generating, by the computer, a feature vector for the ANI based upon the plurality features extracted from the one or more prior calls associated with the ANI; and
  generating, by the computer, a gateway score for the ANI profile by applying an anomaly detection to the ANI;
obtaining, by the computer, a gateway threshold and a contamination factor associated with the gateway threshold; and
identifying, by the computer, at least one ANI as at least one gateway based upon the gateway score of the at least one ANI and the gateway threshold.

2. The method according to claim 1, further comprising determining, by the computer, a number of gateways identified by the computer in the at least one gateway.

3. The method according to claim 1, further comprising adjusting, by the computer, the gateway threshold according to the contamination factor and a number of gateways identified by the computer in the at least one gateway.

4. The method according to claim 1, further comprising:
  generating, by the computer, an inbound feature vector for an inbound ANI based upon a plurality inbound features extracted from inbound call data of an inbound call; and
  generating, by the computer, an inbound gateway score for the inbound ANI based upon the inbound feature vector.

5. The method according to claim 4, further comprising identifying, by the computer, the inbound ANI as a gateway based upon the inbound gateway score and the gateway threshold.

6. The method according to claim 4, further comprising authenticating, by the computer, the inbound call associated with the inbound ANI based upon the inbound gateway score the gateway threshold.

7. The method according to claim 1, wherein obtaining the contamination factor includes receiving, by the computer, the contamination factor from a client device.

8. The method according to claim 1, wherein the plurality of features include at least one of:
  a number of calls from the ANI to each of the callees receiving a comparatively larger number of calls normalized by a calls threshold,
  a number of calls from the ANI to each type of callee receiving the comparatively larger number of calls,
  a lowest interarrival interval between consecutive calls, or
  a network type of the ANI.

9. The method according to claim 1, wherein the computer obtains the call data and feature vector for each ANI according to a lookback window.

10. The method according to claim 1, wherein obtaining the call data of the plurality of prior calls comprises, for each ANI:
  generating, by the computer, a volume score, a spread score, and a call diversity score;
  generating, by the computer, a rules-based gateway score; and
  generating, by the computer, a combined gateway score based upon the gateway score generated using the feature vector and the rules-based gateway score.

11. A system comprising:
a computer comprising a processor and non-transitory storage medium containing executable instructions, and configured to:
  obtain call data for a plurality of prior calls associated with a plurality of automatic number identifications (ANIs);
  for each ANI of the plurality of ANIs:
    extract a plurality of features from one or more prior calls associated with the ANI of the plurality of prior calls;
    generate a feature vector for the ANI based upon the plurality features extracted from the one or more prior calls associated with the ANI; and
    generate a gateway score for the ANI profile by applying an anomaly detection to the ANI;
  obtain a gateway threshold and a contamination factor associated with the gateway threshold; and
  identify at least one ANI as at least one gateway based upon the gateway score of the at least one ANI and the gateway threshold.

12. The system according to claim 11, wherein the computer is further configured to determine a number of gateways identified by the computer in the at least one gateway.

13. The system according to claim 11, wherein the computer is further configured to adjust the gateway threshold according to the contamination factor and a number of gateways identified by the computer in the at least one gateway.

14. The system according to claim 11, wherein the computer is further configured to:
  generate an inbound feature vector for an inbound ANI based upon a plurality inbound features extracted from inbound call data of an inbound call; and
  generate an inbound gateway score for the inbound ANI based upon the inbound feature vector.

15. The system according to claim 14, wherein the computer is further configured to identify the inbound ANI as a gateway based upon the inbound gateway score and the gateway threshold.

16. The system according to claim 14, wherein the computer is further configured to authenticate the inbound call associated with the inbound ANI based upon the inbound gateway score the gateway threshold.

17. The system according to claim 11, wherein when obtaining the contamination factor wherein the computer is further configured to receive the contamination factor from a client device.

18. The system according to claim 11, wherein the plurality of features include at least one of:
  a number of calls from the ANI to each of the callees receiving a comparatively larger number of calls normalized by a calls threshold,
  a number of calls from the ANI to each type of callee receiving the comparatively larger number of calls,
  a lowest interarrival interval between consecutive calls, or
  a network type of the ANI.

19. The system according to claim 11, wherein the computer is configured to obtain the call data and feature vector for each ANI according to a lookback window.

20. The system according to claim 11, wherein when obtaining the call data of the plurality of prior calls the computer is further configured to, for each ANI:
  generate a volume score, a spread score, and a call diversity score;
  generate a rules-based gateway score; and generate a combined gateway score based upon the gateway score generated using the feature vector and the rules-based gateway score.

\* \* \* \* \*